United States Patent [19]

Clay

[11] 4,286,928

[45] Sep. 1, 1981

[54] PUMPING UNIT

[75] Inventor: Robert A. Clay, Tustin, Calif.

[73] Assignee: Robert R. Hermann, St. Louis, Mo.

[21] Appl. No.: 5,179

[22] Filed: Jan. 22, 1979

Related U.S. Application Data

[63] Continuation-in-part of Ser. No. 721,039, Sep. 7, 1976, abandoned.

[51] Int. Cl.³ .......................... F04B 17/00; F03G 3/04
[52] U.S. Cl. ...................................... 417/329; 60/639; 92/11
[58] Field of Search ................... 417/329; 60/639, 640, 60/675; 185/31, 32; 137/393; 92/8, 10, 11; 74/230.01; 188/290

[56] References Cited

U.S. PATENT DOCUMENTS

| 268,641 | 12/1882 | Dittmar et al. | 188/290 |
|---|---|---|---|
| 299,574 | 6/1884 | Page | 417/329 |
| 339,062 | 3/1886 | Kaufmann | 137/393 |
| 459,280 | 9/1891 | Garrett, Jr. | 417/329 |
| 562,721 | 6/1896 | Garrett, Sr. | 417/329 |
| 643,156 | 2/1900 | Quick | 91/440 |
| 940,312 | 11/1909 | Hanson | 417/329 |
| 1,085,703 | 2/1914 | Rochelle | 60/639 |
| 1,169,243 | 1/1916 | Crowe | 417/329 |
| 1,207,824 | 12/1916 | Wendt | 417/329 |
| 1,247,520 | 11/1917 | Fessenden | 60/398 |
| 2,369,374 | 2/1945 | Snyder | 417/329 |
| 2,477,359 | 7/1949 | Barksdale | 91/440 |
| 3,345,950 | 10/1967 | Bender | 74/590 |
| 3,352,108 | 11/1967 | Eddy | 60/275 |
| 3,463,036 | 8/1969 | O'Connor | 92/11 |
| 3,521,445 | 7/1970 | Grable | 60/639 |
| 3,651,635 | 3/1972 | Clay | 417/329 |

Primary Examiner—Leonard E. Smith
Attorney, Agent, or Firm—Senniger, Powers, Leavitt and Roedel

[57] ABSTRACT

A pumping unit for removing oil or the like from a well. The unit comprises a tower, a sump at the bottom of the tower and a reservoir at an elevation above the sump. A liquid, such as oil or water, is pumped from the sump up to the reservoir. A wheel is mounted at the top of the tower above the reservoir for rotation, and a line extends over the wheel for attachment at one end to a polished rod load outside the tower and at its other end to a receptacle inside the tower serving as a counter weight for the polished rod load. The receptacle is reciprocally movable up and down in the tower between the reservoir and the sump, liquid being transferred from the reservoir to the receptacle as it approaches the reservoir in an amount sufficient to reverse the upward movement of the receptacle, causing it to descend in the tower, and liquid being transferred from the receptacle to the sump as the receptacle approaches the sump in an amount sufficient to reverse the downward movement of the receptacle, causing it to ascend in the tower.

12 Claims, 10 Drawing Figures

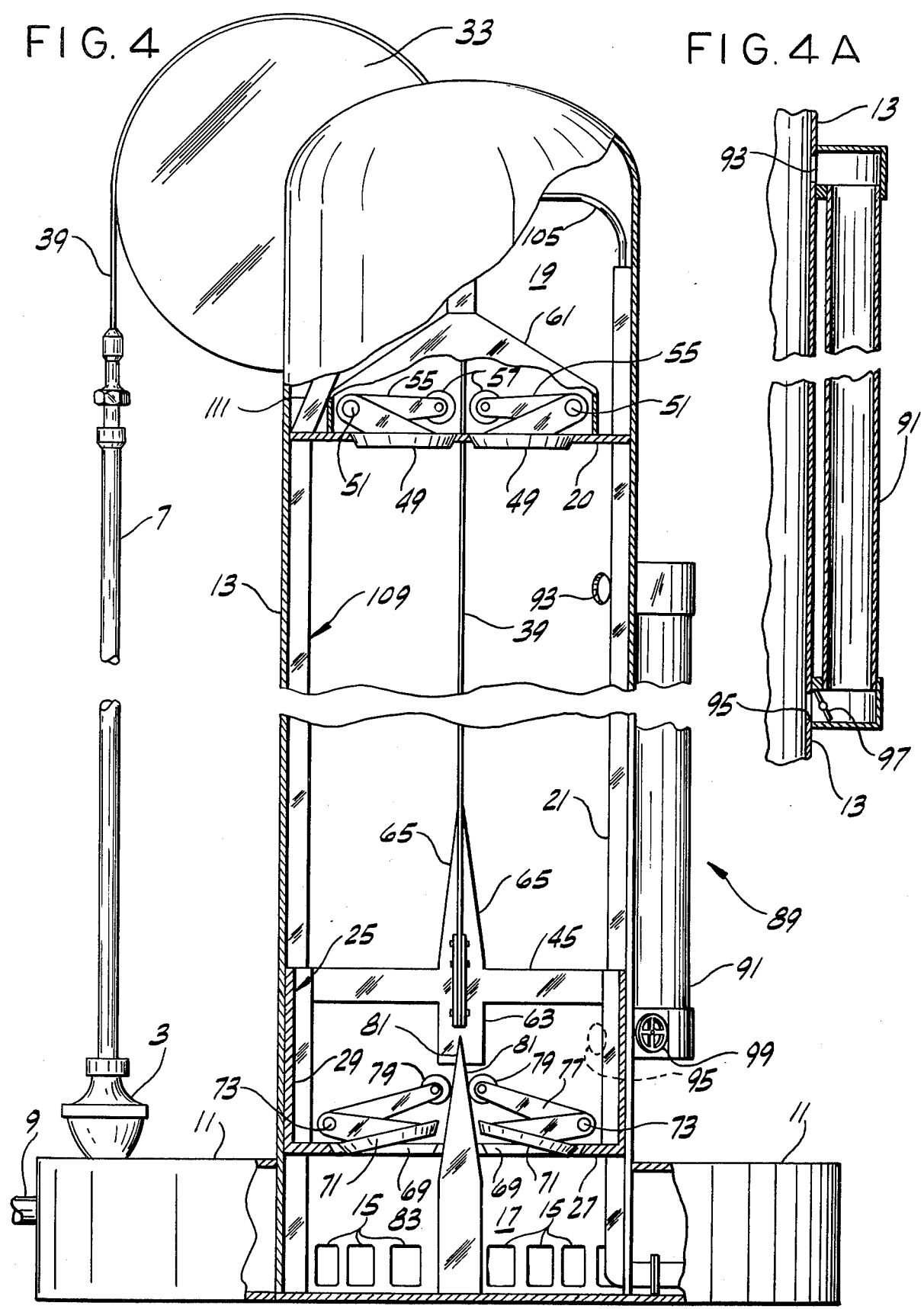

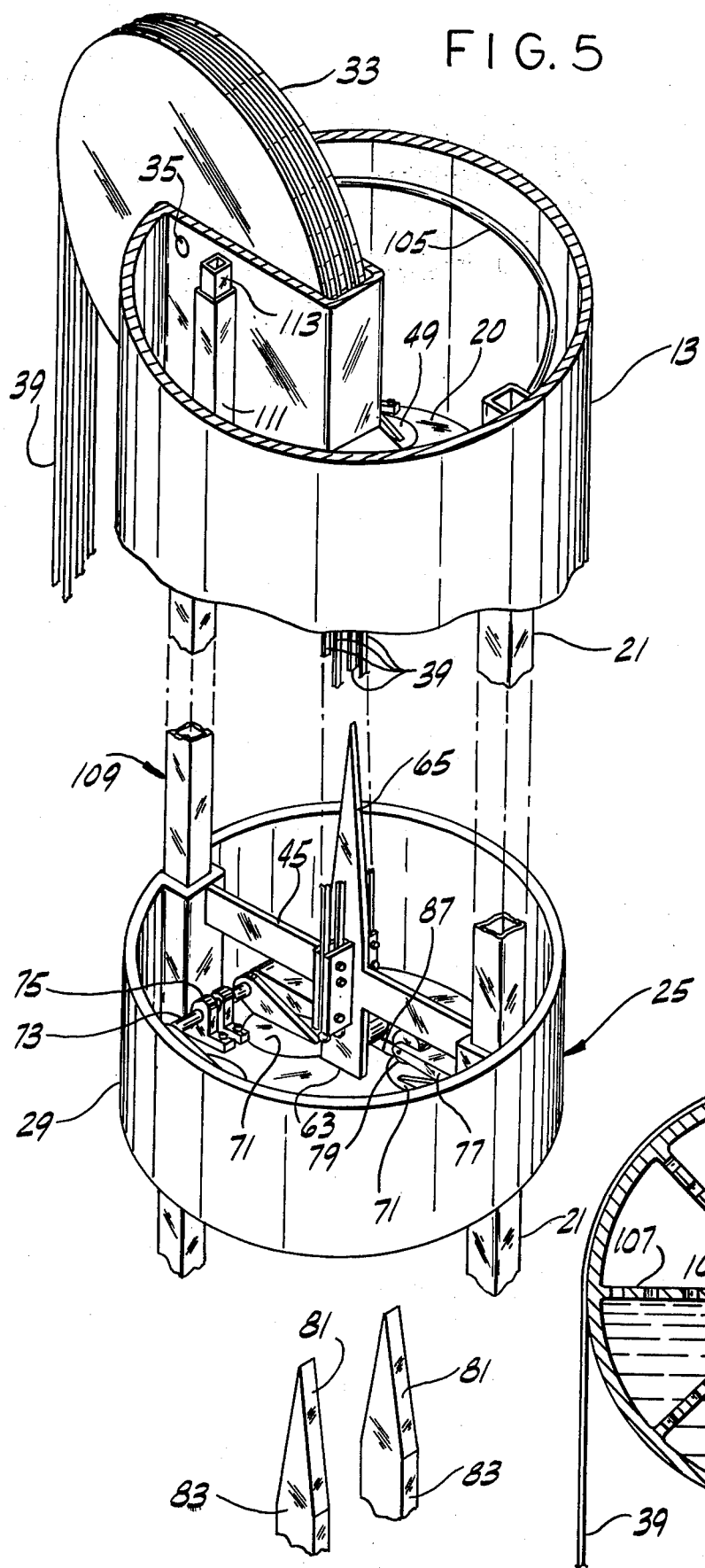

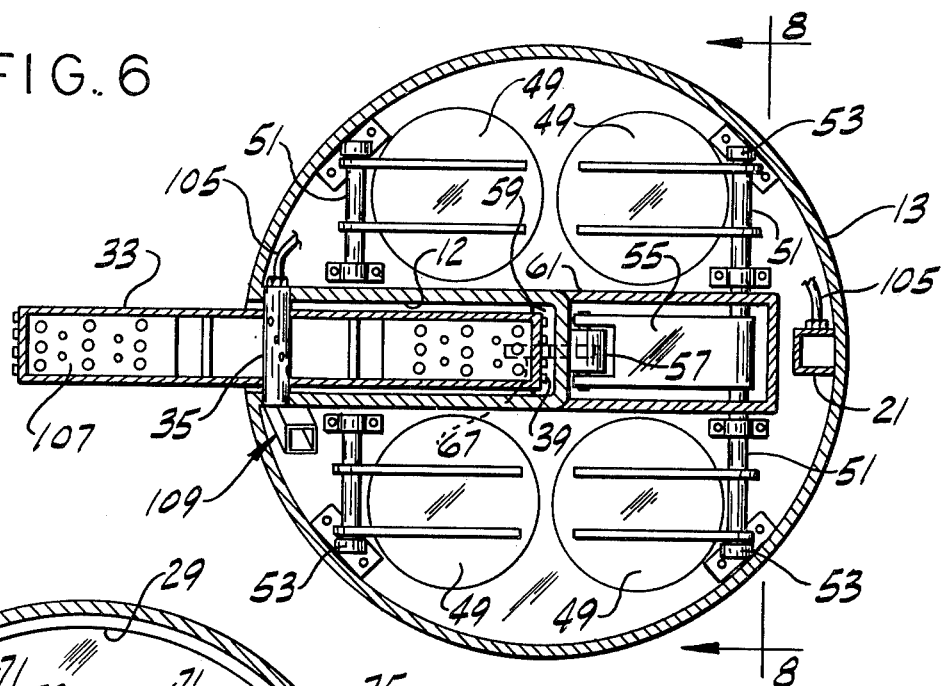
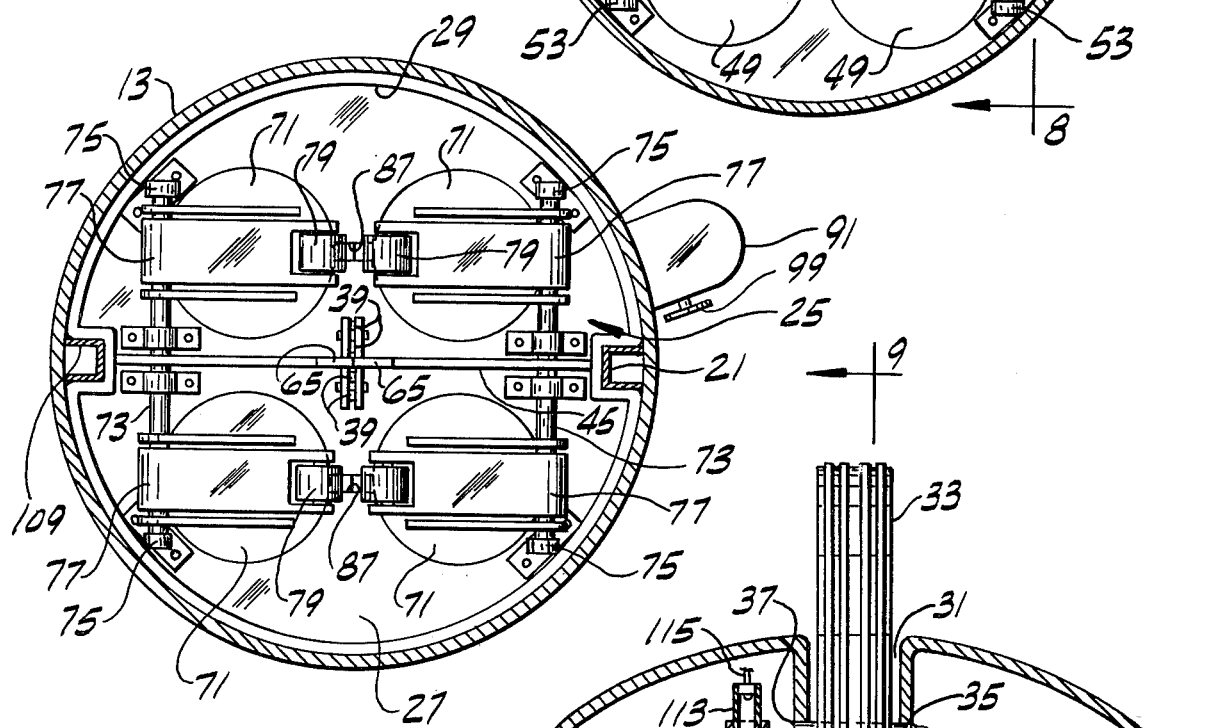
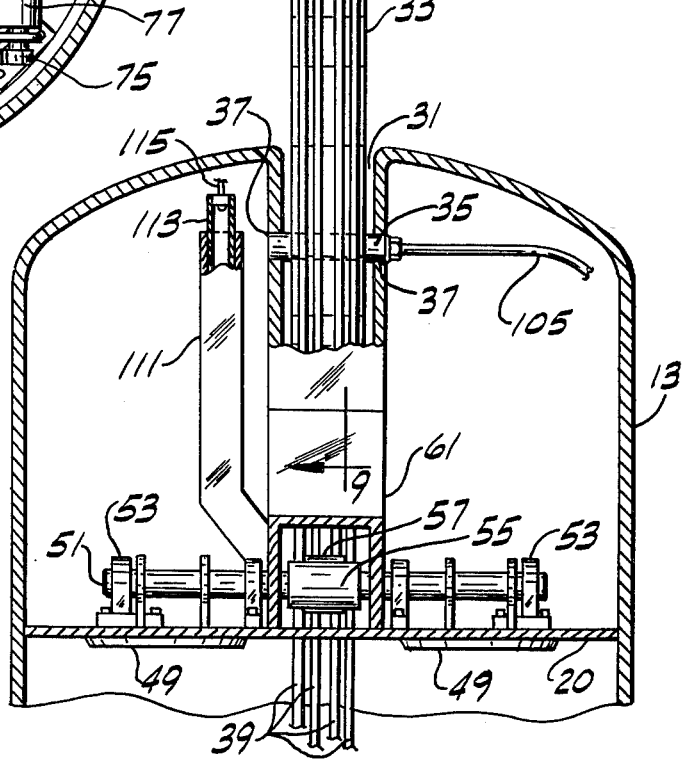

PUMPING UNIT

CROSS-REFERENCE TO RELATED APPLICATIONS

This is a continuation-in-part of my application Ser. No. 721,039, filed Sept. 7, 1976, now abandoned.

BACKGROUND OF THE INVENTION

Since relatively few oil wells flow from natural pressures, most wells require a pumping unit to remove the oil. One type of pumping unit heretofore used comprises a base, a beam (known in the art as a "walking beam") pivotally mounted on the base, and an electric or internal combustion engine which, through a large speed reducer, drives a linkage connected to one end of the beam for rocking the beam on the base about a generally horizontal axis. The other end of the beam is connected, by means of a cable, for example, to a polished rod which extends vertically through the well head. A string of sucker rods extend from the polished rod down into the well inside a well casing to a plunger-type pumping valve which is positioned adjacent the oil-producing formation. As the beam is rocked on the base, the sucker rods reciprocate up and down in the well casing and oil is pumped up and out the well casing to storage vessels.

This type of prior art pumping unit is subject to a number of disadvantages, one being that its pumping motion is relatively jerky, with abrupt changes in acceleration and deceleration of the beam. This type of motion causes undue stress in the sucker rods, resulting in metal fatigue and premature rod failure. The tendency for rod failure to be incurred in the use of conventional pumping units is aggravated by the operation of the unit to force the rods through any obstructions in the well.

Another disadvantage of a beam-type pumping unit arises from the fact that the stroke of the unit is shorter than a sucker rod which is typically 25-30 feet in length. Thus, the unit cannot be used to pull a broken or otherwise defective rod from the well. Instead, the pumping unit must be removed from the well and a special tower installed to remove the sucker rod. This is a time-consuming and expensive operation, especially since the well remains unproductive during the entire procedure. The fact that a typical beam-type pumping unit has a relatively short stroke is further disadvantageous in that the unit pumps only a relatively small amount of oil per pumping cycle from the well. Therefore, a relatively large number of cycles are required to pump a given quantity of oil from the well. This, of course, also tends to reduce the working life of the sucker rods. In addition, this type of prior art pumping unit utilizes large counterweights on the walking beam to assist in the oil pumping operation and requires the use of power units having substantial horsepower ratings.

One proposed solution to the problems associated with conventional beam-type pumping units is disclosed in my U.S. Pat. No. 3,651,635 for a Pumping Jack, issued Mar. 28, 1972. The pumping jack of that patent includes an elongate tubular member pivotally mounted at its middle on a base for rocking on the base about a generally horizontal axis. The jack further comprises a pair of spherical reservoirs at opposite ends of the member and in fluid communication with the latter. Transfer of liquid from one reservoir to the other and vice versa through the tubular member is effected by a pump and valve assembly and causes the member to rock on the base about its pivot so as to achieve the desired pumping action. This pumping jack represents an improvement over conventional pumping units in that it provides a smooth, controllable pumping action and has no tendency to snap the sucker rods. On the other hand, the pumping jack of the aforementioned patent still has a relatively short stroke, requires a large number of pumping cycles to pump a given volume of oil from the well, and cannot be used for replacing rods or otherwise servicing the well.

Another prior art pumping unit designed to avoid the problems associated with beam-type pumping units is presently being marketed by the Oilwell Division of United States Steel Company. This pumping unit includes a tower, a pulley mounted at the top of the tower, and cables extending over the pulley. Each cable is attached at one end to a polished rod load (i.e., a polished rod and sucker rods) outside the tower and at its other end to a counterweight inside the tower. A large motor, acting through a speed reducer, on top of the tower drives the pulley in one direction to assist in raising the counterweight as the sucker rod string descends into the well and then in the other direction to assist in raising the sucker rod string to pump oil from the well. While this unit solves some of the problems associated with the beam-type pumping units, others remain. The primary advantage of the Oilwell pumping unit is that it can be made to have a relatively long stroke (e.g., 30 feet) for increasing the amount of oil pumped from the well during a cycle of pumping operation. Thus, fewer pumping cycles are required to pump a given quantity of oil from the well and the rods suffer a correspondingly fewer number of cyclic stresses for a longer working life. On the other hand, the pumping unit tends to impart a relatively uneven motion to the sucker rods. The units are also quite heavy and expensive and require motors having substantial horsepower ratings and power consumption for operation.

SUMMARY OF THE INVENTION

Among the several objects of this invention may be noted the provision of an improved hydraulic pumping unit for removing oil or the like from a well; the provision of such a unit which has a pumping stroke longer than conventional sucker rods for increasing the oil pumped from the well during each pumping cycle of the unit, thereby reducing the number of pumping cycles necessary to pump a given quantity of oil from the well; the provision of such a pumping unit which is readily adapted to pull broken or otherwise defective sucker rods and/or well tubing from a well and then to replace such, thereby reducing the time period during which the well remains inoperative and unproductive; the provision of such a pumping unit which has a smooth motion for smooth acceleration and deceleration of the polished rod and sucker rods for reducing rod stress; the provision of such a pumping unit which is adjustable for controlling the pumping speed of the unit (i.e., the number of pumping cycles per minute); the provision of such a unit which is operable solely by a pump of relatively small size and horsepower with an expected resultant reduction in energy consumption; the provision of such a pumping unit which is relatively lightweight for quick and easy installation on the job site; and the provision of such a unit which is relatively inexpensive to manufacture, reliable in operation, and easy to maintain.

Briefly, a pumping unit of this invention for removing oil or the like from a well comprises a tower, a sump at the bottom of the tower, a reservoir at an elevation above the sump, conduit means interconnecting the sump and the reservoir, and means for pumping a liquid via the conduit means from the sump up to the reservoir. A wheel is mounted on the tower for rotation about a generally horizontal axis at an elevation above that of the bottom of the reservoir. A line extends over the wheel for attachment at one end to a polished rod load outside the tower in the well and at its other end to a receptacle inside the tower serving as a counterweight for the polished rod load. The receptacle is reciprocally movable up and down in the tower between the reservoir and the sump.

The reservoir has an outlet and valve means for the outlet. Means are provided for opening the reservoir valve means solely in response to the receptacle, in moving upwardly, reaching a first predetermined intermediate position, the receptacle continuing to move upwardly for an interval during which liquid is transferred from the reservoir to the receptacle in an amount sufficient to make the combined weight of the receptacle and the liquid therein greater than that of the polished rod load. The receptacle automatically reverses its direction and moves downwardly when the combined weight is greater than that of the polished rod load, the reservoir valve means closing as the receptacle descends. Thus, the reservoir valve means and reservoir valve opening means are responsive to change in magnitude of the polished rod load from one cycle of pumping operation to another for varying the amount of liquid transferred from the reservoir to the receptacle from said one cycle to the other as needed to effect the downward movement of the receptacle in the tower.

The receptacle has an outlet and valve means for the outlet. Means are provided for opening the receptacle valve means solely in response to the receptacle, in moving downwardly, reaching a second predetermined intermediate position below the aforesaid first predetermined position, the receptacle continuing to move downwardly for an interval during which liquid is tranferred from the receptacle to the sump in an amount sufficient to make the combined weight of the receptacle and any liquid remaining therein less than that of the polished rod load. The receptacle automatically reverses its direction and moves upwardly when the combined weight is less than that of the polished rod load, the receptacle valve means closing as the receptacle ascends. Thus, the receptacle valve means and receptacle valve opening means are responsive to change in magnitude of the polished rod load from one cycle of pumping operation to another for varying the amount of liquid transferred from the receptacle to the sump from said one cycle to the other as needed to effect the upper movement of the receptacle in the tower.

Other objects and features will be in part apparent and in part pointed out hereinafter.

BRIEF DESCRIPTION OF THE DRAWINGS

FIG. 4 is a view similar to FIG. 3, showing the receptacle approaching its lower position within the tower;

FIG. 4A is an enlarged section taken on line 4A—4A of FIG. 1;

FIG. 5 is an exploded perspective showing internal components of the tower and receptacle;

FIG. 6 is a horizontal section taken on line 6—6 of FIG. 3;

FIG. 7 is a horizontal section taking on line 7—7 of FIG. 3;

FIG. 8 is an enlarged vertical section taken on line 8—8 of FIG. 6; and

FIG. 9 is a vertical section taken on line 9—9 of FIG. 8, illustrating means for preventing a sudden increase in the speed of rotation of the wheel at the top of the tower.

Corresponding reference characters indicate corresponding parts throughout the several views of the drawings.

DESCRIPTION OF A PREFERRED EMBODIMENT

Figure 1:
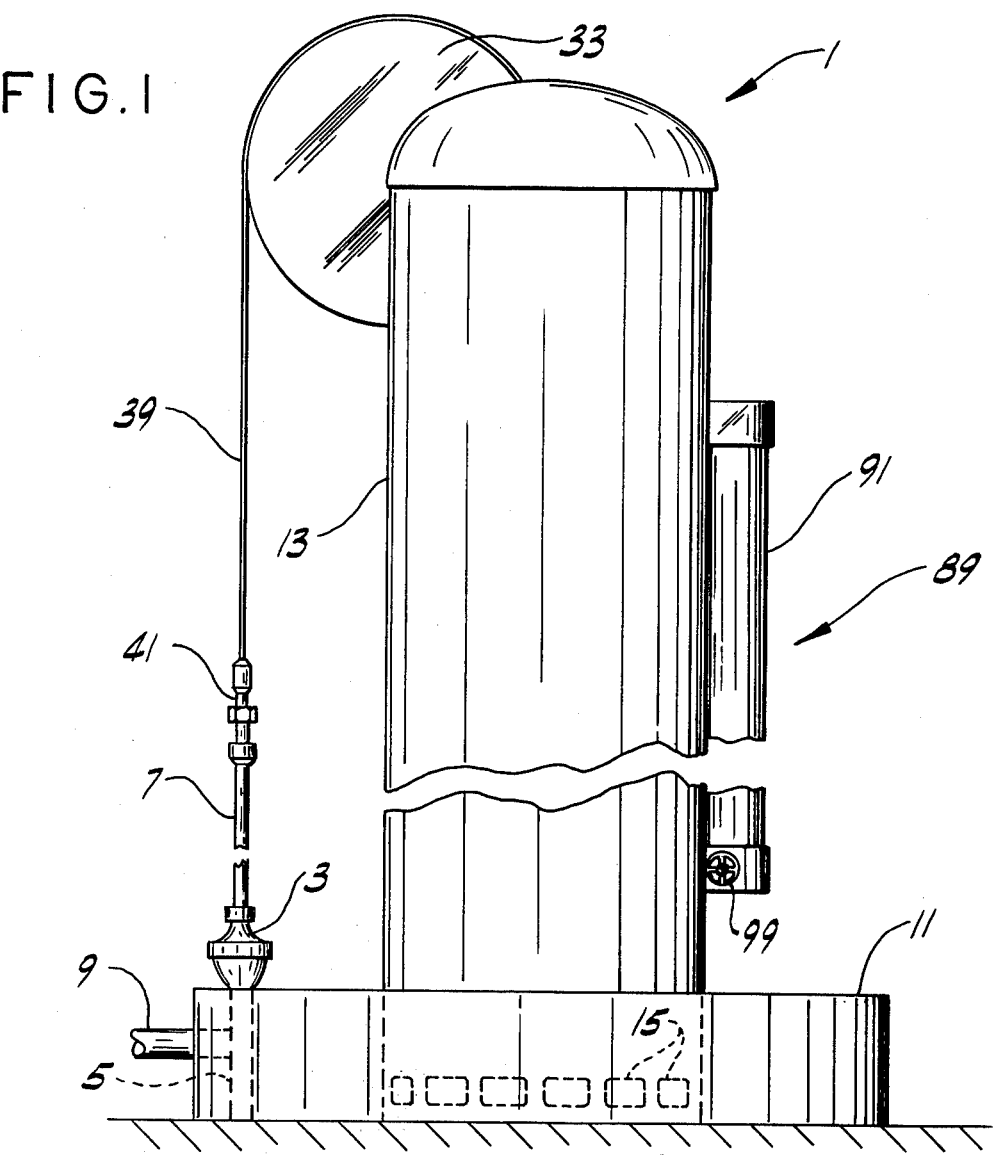
FIG. 1 is a side elevation of a pumping unit of this invention comprising a tower and a wheel mounted at the top of the tower.

Referring now to the drawings, and first more particularly to FIGS. 1-4, the pumping unit of this invention for pumping oil, for example, from a well is designated in its entirety by the reference numeral 1. The pumping unit is shown positioned on the ground adjacent to a well head 3 at the upper end of a well casing 5 which extends vertically down in the well. A polished rod 7 extends upwardly through the well head and is connected to a string of sucker rods (not shown) which extend down inside the well casing 5 to a plunger-type pumping valve (not shown) near the bottom of the well. As the polished rod 7 and string of sucker rods move up and down in the well casing 5, oil is pumped from the well through an outlet 9 in the casing to a suitable storage tank.

Figure 3:
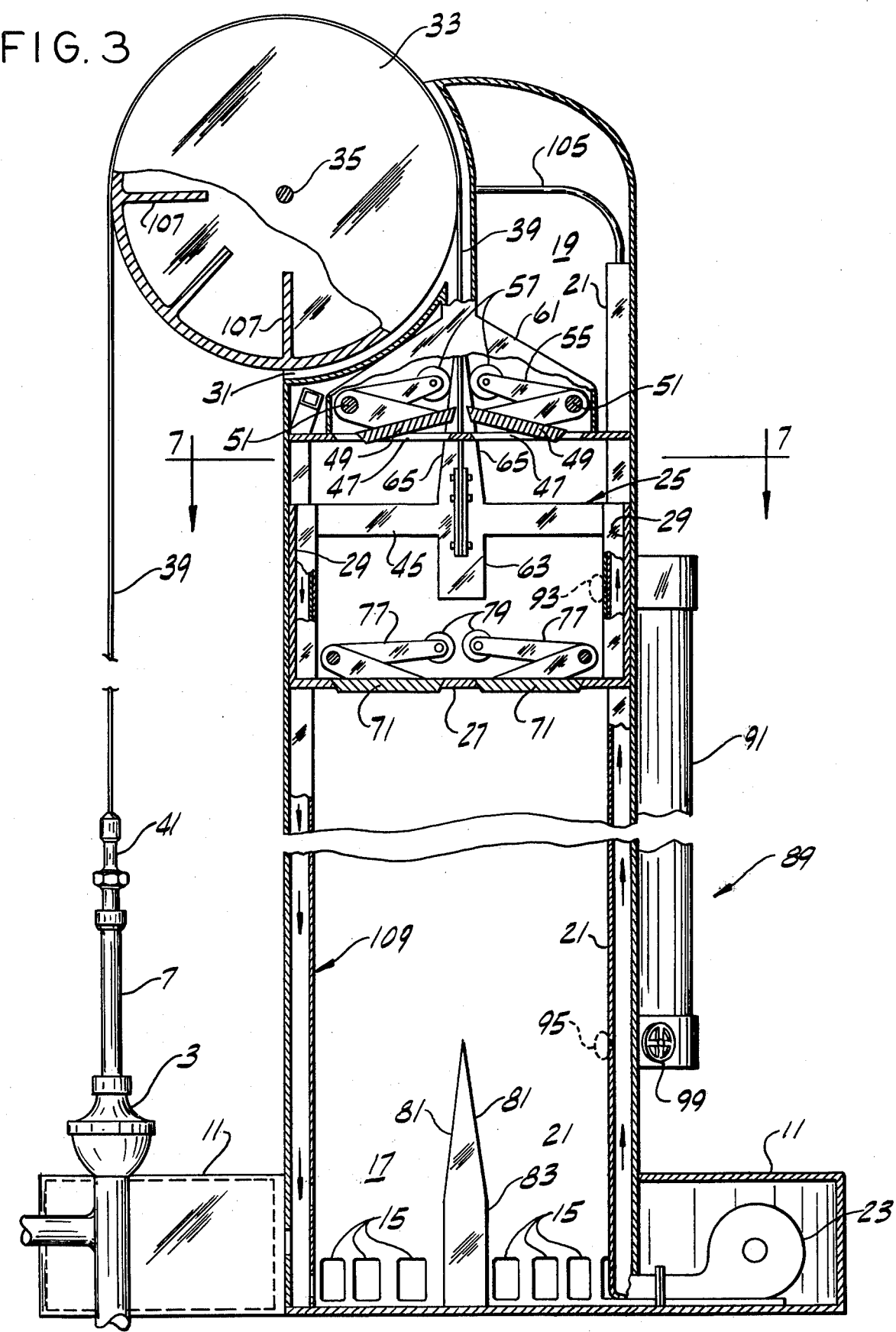
FIG. 3 is a view similar to FIG. 1 with portions broken away to illustrate details, including a receptacle reciprocally movable up and down in the tower, the receptacle being shown in its upper position.

The pumping unit 1 comprises a circular base 11 having a recess 12 therein for accommodating the well head 3 and the upper end of the well casing 5 which projects above the ground. As best shown in FIG. 3, the base 11, which is preferably of a suitable metal, is hollow and contains a liquid (e.g., oil or water) used to drive the pumping unit, as will appear hereinafter. For purposes of clarity, this liquid is not shown in the drawings. Extending up from the bottom of the base through a hole in the top of the base is a cylindrical tower 13 (preferably of the same material as that of the base) having a domed top. The central vertical axis of the tower is generally coincident with that of the base. Openings, each designated 15, in the vertical wall of the tower adjacent the bottom of the tower permit flow of liquid between the interior of the base and the bottom portion of the interior of the tower which together constitute a lower reservoir or sump 17. Indicated at 19 at an elevation above the sump 17 toward the top of the tower is an upper reservoir having a bottom 20. Liquid is pumped, via a conduit 21 extending vertically along the inside wall of the tower, from the sump up to reservoir 19 by a pump 23 (e.g., a motor-driven centrifugal pump) mounted on the inside bottom surface of the base 11.

The pumping unit 1 further comprises a receptacle or bucket, generally indicated at 25, reciprocally movable up and down inside the tower 13 between the upper reservoir 19 and the sump 17. This receptacle 25, which is generally of circular section to conform with the cross section of tower 13, has a bottom 27, a side wall 29 extending up from the bottom, and an open top. The receptacle has an outer diameter slightly less than the inner diameter of the tower, so that it may move freely up and down within the tower, and a weight which is less than the combined weight of the polished rod and the string of sucker rods. Inasmuch as this latter combined weight may vary from well to well, and perhaps even while pumping the same well, it will be understood that the pumping unit of this invention may include means (not shown) for selectively adjusting the weight of the receptacle so that the desired pumping action is obtained, as will appear.

Figure 2:
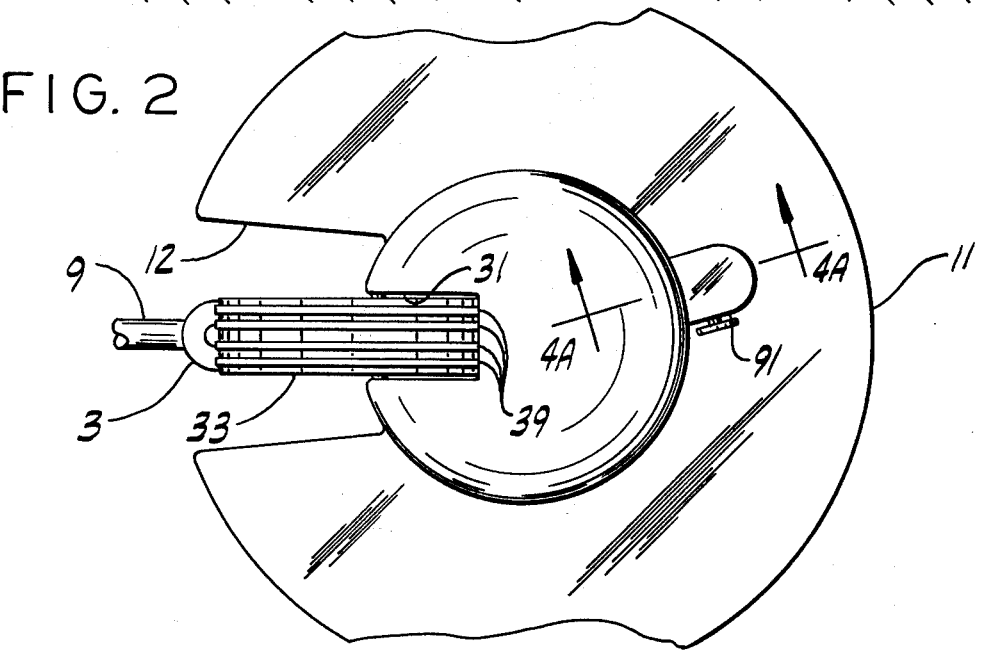
FIG. 2 is a plan of FIG. 1.

As shown best in FIGS. 2, 3 and 8, the top of the tower, which is generally dome-shaped, is formed with a recess 31 therein in which a large wheel or sheave 33 is mounted for rotation about a generally horizontal axis. More particularly, this wheel 33 is mounted on a shaft 35 extending horizontally across the recess and journalled in bearings 37 in portions of the tower bounding the recess. The wheel is mounted so that the central vertical axis of the tower is tangential with the rim of the wheel at one side of the wheel, with the other side of the wheel projecting out beyond the side of the tower.

Extending over this wheel 33 is a plurality of cables or relatively narrow laminated bands 39 (e.g., four bands), each of which is attached at one end by means of a suitable coupling 41 to the polished rod 7, and at its other end at 43 to a crossbar 45 extending between the side walls 29 of the receptacle (FIG. 5). Thus, the receptacle 25 serves as a counterweight for the polished rod load, moving up in the tower during a downward stroke of the sucker rods and down in the tower during an upward stroke of the sucker rods. It will be understood that the length of the stroke of the sucker rods in the well will correspond to the vertical distance traversed by the receptacle between its upper and lower portions. And since the pumping unit may be designed and constructed to make this vertical distance relatively large (30 feet or more, for example), the stroke length of the sucker rods will also be correspondingly large with all of the attendant advantages discussed above.

As shown in FIGS. 3 and 6, the bottom 20 of the upper reservoir 19 has four circular openings therein, each designated 47, constituting outlets for the reservoir, flow of liquid from the reservoir through these openings being controlled by a series of round flapper valves 49, one for each opening 47. Each of these valves 49 is mounted on the inside bottom surface of the reservoir 19 for swinging about a generally horizontal axis between a closed position (FIG. 4) in which it blocks a respective opening 47 to prevent flow of liquid from the reservoir, and an inclined open position (FIG. 3) in which it permits flow of liquid from the reservoir. More specifically, the valves 49 are mounted on a pair of parallel shafts 51 journalled in suitable bearings 53 on the reservoir bottom 20. A rocker arm 55 rigidly secured, as by welding, to the middle of each shaft extends perpendicularly from the shaft toward the central vertical axis of the tower and carries a roller 57 at its outer end. As shown in FIG. 4, the rollers 57 of the two rocker arms 55 are spaced relatively close together, with bands 39 extending down from wheel 33 between the rollers and thence through an opening 59 in the reservoir bottom to the receptacle for attachment to crossbar 45. A water-tight well or housing 61 extending up from the reservoir bottom and surrounding the rocker arms 55 and the portions of shafts 51 to which the arms are secured prevents the flow of liquid from the reservoir through opening 59 in the reservoir bottom.

Means for opening the reservoir valves 49 is shown best in FIG. 3 to comprise an elongate tapered actuator 63 having upwardly convergent edges 65. This actuator is rigidly affixed (e.g., welded) to crossbar 45 of the receptacle and extends upwardly therefrom generally in a central vertical plane of the tower between adjacent bands 39. As the receptacle, in moving upwardly, approaches the reservoir 19 and reaches a predetermined intermediate position, the actuator 63 passes through a slot 67 in the reservoir bottom and then simultaneously engages both rollers 57 of rocker arms 55 to pivot the latter upwardly about the axes of shafts 51. This, in turn, causes the reservoir valves 49 to swing upwardly toward an open position for transfer of liquid from the reservoir through outlets 47 into the receptacle. The valves 49 remain open for continued flow of liquid into the receptacle until the latter begins to descend whereupon the valves begin to swing toward a closed position. It is important to note for reasons which will be more fully explained hereinafter that liquid continues to flow into the receptacle as it moves downwardly until the receptacle again reaches its aforesaid predetermined intermediate position, at which point the actuator 63 disengages the rollers 57 at the outer ends of rocker arms 55 to permit the valves to shut completely.

The bottom 27 of receptacle 25 also has four circular outlet openings 69 therein (see FIGS. 4 and 7). Flow of liquid from the receptacle through these openings 69 is controlled by a series of valves 71, one for each opening. Each of these valves is mounted on the bottom 27 of the receptacle for swinging about a generally horizontal axis between a closed position in which it blocks a respective opening 69 to prevent flow of liquid from the receptacle, and an open position for permitting the flow of liquid from the receptacle. More particularly, the receptacle valves 71 are welded or otherwise rigidly secured to a pair of parallel shafts 73, two valves to a shaft, journalled in bearings 75 on the receptacle bottom 27. Extending perpendicularly from the shafts 73 over the openings 69 are four rocker arms, each of which is designated 77 and each of which has a roller 79 at its outer end. As shown in FIG. 7, the rollers 79 on the two rocker arms 77 extending from one shaft are spaced relatively close to the rollers on the two rocker arms extending from the other shaft for simultaneous engagement of all four rollers by the upwardly convergent edges 81 of two actuators 83 (each similar to actuator 63 on the receptacle) projecting up from the bottom of the base 11. Thus, as the receptacle 25, in moving downwardly, approaches the sump 11 and reaches a second predetermined intermediate position, the actuators 83 pass through two elongate openings 87 in the bottom 27 of the receptacle and engage rollers 79 to pivot the rocker arms 77 upwardly about the axes of shafts 73. This causes the receptacle valves 71 to swing upwardly toward an open position for transfer of liquid from the receptacle through outlet openings 69 into the sump. Due to their own weight and that of any liquid remaining in the receptacle bearing down on their inclined upper faces, the valves automatically begin to swing shut as soon as the receptacle begins to ascend in the tower. Therefore, any liquid remaining in the receptacle continues to flow into the sump until the receptacle reaches the aforesaid second predetermined intermediate position, at which point the actuators 83 disengage the rollers 79 of rocker arms 77 to permit the receptacle valves 71 to shut completely.

Although the reservoir and receptacle valves 49, 71 and the actuators 63, 83 for opening them have been found to operate in a wholly satisfactory manner, it will be understood that other types of valves and valve-opening means are also suitable, such as those disclosed in my copending application, Ser. No. 721,039, filed Sept. 7, 1976 (see FIGS. 2, 3 and 5-8).

Indicated generally at 89 in the drawings on the outside of the tower 13 is means for controlling the speed at which the receptacle 25 moves up and down in the tower. More specifically, this means comprises an air duct extending vertically along the tower on the outside thereof. The upper end of this air duct, generally circular in section, communicates with the interior of the tower above the receptacle (constituting an upper substantially closed chamber) through a first opening designated 93 spaced below the bottom 20 of the reservoir 19. The lower end of the duct communicates with the interior of the tower below the receptacle (constituting a lower substantially closed chamber) through a second opening designated 95 spaced above the sump 11. Thus, the air duct permits flow of air from the interior of the tower below the receptacle to the interior of the tower above the receptacle during downward movement of the receptacle in the tower and permits flow of air from the interior of the tower above the receptacle to the interior of the tower below the receptacle during upward movement of the receptacle in the tower. Means 89 also includes a damper 97 pivotally mounted in the air duct 91 at the lower opening 95. The position of this damper is selectively adjustable via a wheel 99 for controlling the volume of air flowing through the air duct and hence the speed at which the receptacle reciprocates in the tower. Thus, with the damper 97 fully closed and precluding any substantial flow of air through the air duct, the speed of the receptacle is reduced inasmuch as air trapped between the receptacle and the reservoir during upward movement of the receptacle cannot readily flow past the receptacle to the bottom of the tower, and air trapped between the receptacle and the sump during downward movement of the receptacle cannot readily flow past the receptacle to the top of the tower. Compression of the trapped air reduces the terminal velocity of the receptacle. However, when the damper is slid open, air flow is readily permitted and, consequently, the speed of the receptacle increases, with the extent of increase depending on how far the damper is opened.

The location of the opening 93 at the upper end of the duct is such that it is adapted to be blocked by the side wall 29 of the receptacle 25 as it approaches the reservoir 19, thereby preventing further flow of air through duct 91 regardless of the position of damper 97. This is advantageous in that the air trapped between the receptacle and the reservoir provides a cushion to slow the upward movement of the receptacle as it approaches the reservoir bottom 20 to assist in preventing the receptacle from striking the bottom of the reservoir. Similarly, the opening 95 at the lower end of the air duct is located in such a position that it is blocked by the receptacle as the latter approaches the sump, with the air between the receptacle and the sump providing a cushion to slow the downward movement of the receptacle in the tower and to help prevent it from striking the liquid in the sump.

As shown in FIG. 9, the wheel 33 at the top of the tower is hollow and adapted to be at least partially filled with a liquid. In this regard, the shaft 35 on which the wheel is mounted has an axial bore 101 through it, and a series of ports 103 provide fluid communication between the bore and the interior of the wheel. A pipe 105 interconnects one end of bore 101 with conduit 21 for forced flow of liquid from the conduit into the interior of the wheel, at least until the wheel is half-filled with liquid, at which point any additional liquid will flow out the other end of shaft 35 into the reservoir 19. A plurality of perforated members or vanes 107, lying in radial planes of the wheel, project inwardly into the interior of the wheel from the inside surface of the wheel. On rotation of the wheel, these vanes 107 engage the liquid in the wheel and inhibit any sudden increase (i.e., runaway) in the speed of rotation of the wheel. Thus, the vanes assist in providing for a relatively smooth acceleration and deceleration of the wheel which results in a correspondingly smooth pumping action.

Extending vertically on the inside wall of the tower generally opposite conduit 21 is an overflow pipe, generally indicated at 109, interconnecting the sump 17 and the reservoir 19 and providing for overflow of liquid from the reservoir to the sump in the event the level of liquid in the reservoir should rise above a predetermined level. This pipe comprises a long lower section 111 and a short upper section 113 which has a telescopic sliding fit in the lower section for adjusting the level at which liquid in the reservoir overflows into the sump. The axial adjustment of the upper section in the lower section is accomplished by means of a line 115 attached to the upper section and extending therefrom to any suitable adjustment mechanism (not shown). The overflow pipe 109 and conduit 21, each of which are of generally square section, also serve as guide rails for the receptacle as it reciprocates in the tower.

A cycle of pumping operation of a pumping unit of this invention is described hereinafter, starting with the point in the cycle at which the polished rod and sucker rods are descending toward the bottom of the well and the receptacle 25, which weighs less than the combined weight of the polished rod 7 and the string of sucker rods, is ascending in the tower toward the reservoir 19. For purposes of this discussion, it will be assumed that the damper 97 in air duct 91 is at least partially open so that as the receptacle ascends in the tower air is forced from the interior of the tower above the receptacle down through the air duct to the interior of the tower below the receptacle. When the receptacle, in moving upwardly, reaches a first predetermined intermediate position in the tower, the acuator 63 extending up from the receptacle engages the rollers 57 on rocker arms 55 to begin swinging the four reservoir valves 49 open for transfer of liquid from the reservoir to the receptacle. It will be observed that the reservoir valves are opened solely in response to the upward movement of the receptacle. The receptacle continues to move upwardly for an interval during which time the reservoir valves are swung further open for the transfer of additional liquid to the receptacle. This, together with the cushion of air between the receptacle and the reservoir bottom, slows the ascent of the receptacle. As soon as the amount of liquid transferred to the receptacle is sufficient to make the combined weight of the receptacle and the liquid therein greater than that of the polished rod load (i.e., the magnitude of the force required to lift the sucker rods in the well), the receptacle automatically reverses its direction and moves downwardly in the tower. It will be understood that the receptacle does not touch the bottom of the reservoir, the length of the actuator 63 being such that the reservoir valves 49 are opened and an amount of liquid is transferred to the receptacle sufficient to reverse its direction prior to the receptacle reaching the bottom of the reservoir. Thus, there is a smooth upward deceleration of the receptacle and then a smooth downward acceleration of the receptacle. The reservoir valves 49 begin to close as the receptacle descends in the tower, but only relatively gradually due to the rolling contact of rollers 57 on the tapered edges 65 of the actuator. It is desirable that the reservoir valves remain open during this initial downward travel of the receptacle to ensure that the weight of the receptacle and liquid therein is sufficient to overcome not only the weight of the polished rod, sucker rods and oil being pumped, but also any frictional losses in the well. When the receptacle reaches its aforesaid first predetermined intermediate position, the actuator 63 disengages the rollers 57 and the reservoir valves 49 swing completely shut.

It will be noted that the reservoir valve mechanism (i.e., valves 49, shafts 51 and rocker arms 55) and actuator 63 are cooperable to respond to any change in magnitude of the polished rod load from one cycle of pumping operation to another, such as, for example, in the case where the sucker rods, in moving upwardly in the well, encounter sufficient resistance to stop or slow the descent of the receptacle in the tower. If the reservoir valves 49 are still open, liquid will continue to pour into the receptacle until the resistance is overcome and the receptacle resumes its downward course. The receptacle is, however, designed to carry only a specified maximum amount of liquid so that in the event of a major hang-up of the sucker rods in the well, it will overflow prior to failure of the rods. Similarly, if there is a gradual increase in the polished rod load during successive upstrokes of the sucker rods (due to an increase in oil viscosity, friction losses, or an increase in the amount of oil being pumped, for example), the amount of liquid cyclically transferred to the receptacle will increase to compensate for the increased load. This happens automatically since the receptacle will not descend in the tower until an amount of liquid has been transferred to it sufficient to make the combined weight of the receptacle and the liquid therein greater than the polished rod load. On the other hand, if there is a decrease, either sudden or gradual, in the polished rod load from one upstroke of the sucker rods to another, the amount of liquid transferred to the receptacle will automatically be reduced to compensate for the change. This automatic weight compensation feature ensures that the amount of liquid transferred from the reservoir to the receptacle is the minimum required to produce the desired result. This minimizes the work required of pump 19 which pumps liquid from the sump up to the reservoir.

As the receptacle 25 continues its descent in the tower toward the sump 17, it raises the polished rod and sucker rods to pump oil from the well via outlet 9 in the well casing 5. Concomitantly, air is forced from the interior of the tower beneath the receptacle up through the air duct to the interior of the tower above the receptacle. When the receptacle, in moving downwardly, reaches a second predetermined intermediate position in the tower, the two actuators 83 extending up from the bottom of the sump pass through the elongate openings 87 in the receptacle bottom 27 and engage the rollers 79 on rocker arms 77 to begin swinging the receptacle valves 71 open. Thus, it will be apparent that the receptacle valves are opened solely in response to the downward movement of the receptacle. The receptacle continues to move downwardly for an interval during which liquid is drained from the receptacle through outlets 69 into the sump. This, in combination with the cushioning effect of the air trapped between the bottom of the receptacle and the sump, slows the downward movement of the receptacle. As soon as an amount of liquid has been transferred from the receptacle sufficient to make the combined weight of the receptacle and any liquid remaining therein less than that of the polished rod load (i.e., the magnitude of the net force effective for moving the sucker rods, which are now at the top of their stroke, downwardly in the well), the receptacle automatically reverses its direction and moves upwardly in the tower. The receptacle does not touch the sump or any liquid therein inasmuch as the length of each of the two actuators projecting up from the sump bottom is such that the receptacle valves 71 are opened and an amount of liquid is transferred to the sump sufficient to reverse the receptacle's descent prior to the receptacle reaching the sump. Thus, there is a smooth transition between the downward movement of the receptacle toward the sump and the upward movement of the receptacle away from the sump.

The receptacle valves 71 begin to close as soon as the receptacle begins its ascent in the tower, but only relatively gradually due to the rolling contact of the rollers 79 on the tapered actuator edges 81. It is desirable that the receptacle valves remain open during this initial upward movement of the receptacle to allow further discharge of liquid from the receptacle and ensure that the combined weight of the polished rod and sucker rods is sufficient to overcome not only the weight of the receptacle and that of any liquid remaining therein, but also any frictional losses as the sucker rods descend in the well. When the receptacle reaches the aforesaid second predetermined position, the two actuators 83 disengage rollers 79, and the receptacle valves swing completely shut. The receptacle continues its upward movement in the tower until it reaches the point at which the actuator 63 on the receptacle again engages the rollers 57 to open the reservoir valves 49. The cycle then repeats.

It will be observed that the receptacle valve mechanism (i.e., receptacle valves 71, shafts 73 and rocker arms 77) and actuators 83 are also cooperable to respond to any changes, either gradual or sudden, in magnitude of the polished rod load during successive downstrokes of the sucker rod string in the well. For example, assume that the sucker rods, in moving downwardly in the well, encounter a hang-up sufficient to stop the descent of the rods. If the receptacle valves 71 are still open, liquid will continue to flow from the receptacle until the rods resume their descent.

In view of the foregoing, it will be apparent that the receptacle 25 moves smoothly up and down in the tower 13. As a result, the string of sucker rods in the well also reciprocates smoothly with no sharp accelerations or decelerations. This is advantageous in that the rods are not subjected to the harsh stresses typically encountered with conventional pumping units. It will also be apparent that the pumping unit 1 can be designed and constructed so that the vertical distance traversed by the receptacle in the tower between its upper and lower positions is relatively great (e.g., 30 feet) so as to effect a correspondingly long stroke of the sucker rods in the well. As explained above, this is advantageous in that the rods, in pumping a given quantity of oil, undergo fewer cycles of pumping operation than would be the case if they were attached to a conventional pumping unit which typically has a much shorter stroke.

Inasmuch as the pumping unit of this invention has a stroke which is contemplated as being longer than the length of conventional sucker rods, the unit can be used to pull and replace sucker rods and well casing. For this purpose, a work platform may be erected adjacent the top of tower 13 and a manually-operated brake installed on wheel 33. After the receptacle 25 has reached the bottom of the tower and pulled a sucker rod out of the well casing, an operator on the platform applies the brake mechanism to the wheel, preventing upward movement of the receptacle. The sucker rod is then disconnected from coupling 41. An auxiliary drive motor connected to shaft 35 may then be used to raise the receptacle, thereby lowering the coupling to a point where it can be connected to the next sucker rod to be pulled. The receptacle is then released, pulling the next sucker rod from the well.

The automatic weight adjustment feature discussed above is significant in that it ensures that the amount of liquid transferred to and from the receptacle is the minimum required to produce the desired result, which is a smooth reciprocating action of the receptacle in the tower and of the sucker rods in the well. This, in turn, minimizes the work required of pump 19 which pumps liquid from the sump up to the reservoir. In this regard, it will be noted that the only energy required to operate pumping unit 1 is that drawn by pump 19. It is contemplated that this pump run continuously during operation of the pumping unit for providing an uninterrupted flow of liquid from the sump up to the reservoir, with any excess liquid in the reservoir draining into overflow pipe 109 for transfer back to the sump. As the power requirements of pump 19 are relatively low, a horsepower rating may be selected to be substantially less than those of motors used to drive beam-type pumping units. This, of course, results in considerabale savings in initial capital investment. Savings in energy are also contemplated.

In view of the above, it will be seen that the several objects of the invention are achieved and other adavantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. A pumping unit for removing oil or the like from a well, the unit comprising a tower, a sump at the bottom of the tower, a reservoir at an elevation above the sump, conduit means interconnecting the sump and the reservoir, means for pumping a liquid via the conduit means from the sump up to the reservoir, a wheel mounted on the tower for rotation about a generally horizontal axis at an elevation above that of the bottom of the reservoir, a line extending over the wheel for attachment at one end to a polished rod load outside the tower in the well, a receptacle inside the tower attached to the other end of the line and serving as a counterweight for the polished rod load, the receptacle being reciprocally movable up and down in the tower between the reservoir and the sump, the reservoir having an outlet and valve means for the outlet, means for opening said reservoir valve means as the receptacle approaches the reservoir for flow of liquid from the reservoir into the receptacle, the latter descending after an amount of liquid is received from the reservoir sufficient to make the combined weight of the receptacle and the liquid therein greater than that of the polished rod load, said valve means closing as the receptacle descends, and the receptacle having an outlet and valve means for the outlet, means for opening the receptacle valve means as the receptacle approaches the sump for transfer of liquid from the receptacle into the sump, the receptacle ascending after an amount of liquid is transferred from the receptacle sufficient to make the combined weight of the receptacle and any liquid remaining therein less than that of the polished rod load, the receptacle valve means closing as the receptacle ascends, and an air duct extending generally vertically along the tower on the outside of the tower and communicating at its upper end with the interior of the tower below the reservoir and at its lower end with the interior of the tower above the sump, the interior of the tower above the receptacle constituting an upper substantially closed chamber and the interior of the tower below the receptacle constituting a lower substantially closed chamber, said chambers being in communication with one another via said air duct for permitting flow of air from the lower to the upper chamber during downward movement of the receptacle in the tower and for permitting flow of air from the upper to the lower chamber during upward movement of the receptacle in the tower.

2. A pumping unit as set forth in claim 1 further including means in the air duct for regulating the flow of air through the air duct thereby to modify the speed at which the receptacle moves up and down in the tower.

3. A pumping unit as set forth in claim 1 wherein the upper end of the air duct communicates with the interior of the tower through a first opening in the tower spaced below the reservoir and the lower end of the air duct communicates with the interior of the tower through a second opening in the tower spaced above the sump, the first opening being at an elevation so that it is blocked by the receptacle as it approaches the reservoir with the air between the receptacle and the reservoir providing a cushion to slow the upward movement of the receptacle, and the second opening being at an elevation so that it is blocked by the receptacle as it approaches the sump with the air between the receptacle and the sump providing a cushion to slow the downward movement of the receptacle.

4. A pumping unit for removing oil or the like from a well, the unit comprising a tower, a sump at the bottom of the tower, a reservoir at an elevation above the sump, conduit means interconnectng the sump and the reservoir, means for pumping a liquid via the conduit means from the sump up to the reservoir, a wheel mounted on the tower for rotation about a generally horizontal axis at an elevation above that of the bottom of the reservoir, a line extending over the wheel for attachment at one end to a polished rod load outside the tower in the well, a receptacle inside the tower attached to the other end of the line and serving as a counterweight for the polished rod load, the receptacle being reciprocally movable up and down in the tower between the reservoir and the sump, the reservoir having an outlet and valve means for the outlet, means for opening said reservoir valve means solely in response to the receptacle, in moving upwardly, reaching a first predetermined intermediate position, said receptacle continuing to move upwardly for an interval during which liquid is transferred from the reservoir to the receptacle in an amount sufficient to make the combined weight of the receptacle and the liquid therein greater than that of the polished rod load, the receptacle automatically reversing its direction and moving downwardly when said combined weight is greater than that of the polished rod load, said reservoir valve means closing as the receptacle descends, said reservoir valve means and reservoir valve opening means being responsive to change in magnitude of said load from one cycle of pumping operation to another for varying the amount of liquid transferred from the reservoir to the receptacle from said one cycle to the other as needed to effect the downward movement of the receptacle in the tower, and the receptacle having an outlet and valve means for the outlet, means for opening the receptacle valve means solely in response to the receptacle, in moving downwardly, reaching a second predetermined intermediate position below said first predetermined intermediate position, said receptacle continuing to move downwardly for an interval during which liquid is transferred from the receptacle to the sump in an amount sufficient to make the combined weight of the receptacle and any liquid remaining therein less than that of the polished rod load, said receptacle automatically reversing its direction and moving upwardly when said combined weight is less than that of the polished rod load, said receptacle valve means closing as the receptacle ascends, said receptacle valve means and receptacle valve opening means being responsive to change in magnitude of said load from one cycle of pumping operation to another for varying the amount of liquid transferred from the receptacle to the sump from said one cycle to the other as needed to effect the upward movement of the receptacle in the tower.

5. A pumping unit as set forth in claim 4 wherein said conduit means extends vertically inside the tower and serves as a guide rail for the receptacle.

6. A pumping unit as set forth in claim 4 wherein said means for opening said reservoir valve means comprises an actuator on the receptacle and extending upwardly therefrom for engaging the reservoir valve means to open it as the receptacle approaches the reservoir.

7. A pumping unit as set forth in claim 6 wherein said reservoir outlet comprises an opening in the bottom of the reservoir, and said reservoir valve means comprises a valve member pivotally mounted on the reservoir bottom for swinging about a generally horizontal axis between a closed position in which it blocks said opening and prevents the flow of liquid from the reservoir and an open position in which it permits the flow of liquid from the reservoir, and means engageable by said actuator on the receptacle for swinging the valve member to its open position as the receptacle approaches its upper position.

8. A pumping unit as set forth in claim 4 wherein said means for opening the receptacle valve means comprises an actuator extending up from the bottom of the tower for engaging the receptacle valve means to open it as the receptacle approaches the sump.

9. A pumping unit as set forth in claim 8 wherein the receptacle outlet comprises an opening in the bottom of the receptacle, and said receptacle valve means comprises a valve member pivotally mounted on the receptacle bottom for swinging about a generally horizontal axis between a closed position in which it blocks the opening and prevents the flow of liquid from the receptacle and an open position in which it does not block the opening for allowing liquid to flow from the receptacle, said actuator being adapted to swing the valve member to its open position as the receptacle approaches the sump for transfer of liquid from the receptacle into the sump.

10. A pumping unit as set forth in claim 4 further including an overflow pipe interconnecting the sump and the reservoir and providing for overflow of liquid from the reservoir to the sump when the level of liquid in the reservoir reaches a predetermined level.

11. A pumping unit as set forth in claim 10 wherein said overflow pipe functions as a guide rail for the receptacle.

12. A pumping unit as set forth in claim 10 wherein said overflow pipe comprises upper and lower sections, the upper section being axially adjustable with respect to the lower section for adjusting the level at which liquid in the reservoir overflows into the sump.

* * * * *